United States Patent
Nakatsuji (10) Patent No.: US 10,316,893 B2
(45) Date of Patent: Jun. 11, 2019

(54) WHEEL BEARING APPARATUS

(71) Applicant: NTN Corporation, Osaka-shi (JP)

(72) Inventor: Yuta Nakatsuji, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 15/872,022

(22) Filed: Jan. 16, 2018

(65) Prior Publication Data

US 2018/0135702 A1 May 17, 2018

Related U.S. Application Data

(63) Continuation of application No. PCT/JP2016/070914, filed on Jul. 14, 2016.

(30) Foreign Application Priority Data

Jul. 16, 2015 (JP) .................................. 2015-141921

(51) Int. Cl.

| F16C 35/04 | (2006.01) |
| F16C 35/06 | (2006.01) |
| B60B 27/00 | (2006.01) |
| B60B 35/02 | (2006.01) |
| F16C 19/18 | (2006.01) |
| F16C 33/58 | (2006.01) |

(52) U.S. Cl.
CPC .............. F16C 35/06 (2013.01); B60B 27/00 (2013.01); B60B 35/02 (2013.01); F16C 19/184 (2013.01); F16C 33/586 (2013.01); F16C 19/186 (2013.01); F16C 2226/12 (2013.01); F16C 2326/02 (2013.01)

(58) Field of Classification Search
CPC .... F16C 19/184; F16C 19/386; F16C 35/067; F16C 2326/02; B60B 27/0005; B60B 27/0078; B60B 27/0094
See application file for complete search history.

(56) References Cited

U.S. PATENT DOCUMENTS

| 7,614,796 | B2* | 11/2009 | Hattori | ................ B60B 27/0005 |
| | | | | 384/544 |
| 8,568,036 | B2* | 10/2013 | Torii | ................... B60B 27/0005 |
| | | | | 384/544 |
| 2005/0264094 | A1 | 12/2005 | Yoo et al. | |

FOREIGN PATENT DOCUMENTS

| FR | 3005124 A1 * | 10/2014 | ......... B60B 27/0078 |
| JP | 2003-154801 | 5/2003 | |
| JP | 2005-335700 | 12/2005 | |

(Continued)

*Primary Examiner* — Phillip A Johnson (74) *Attorney, Agent, or Firm* — Harness, Dickey & Pierce, P.L.C.

(57) ABSTRACT

The wheel bearing apparatus has hub bolts (6a) to fasten a wheel secured equidistantly around the wheel mounting flange (6). An annular groove (7a) is formed on the outer-side surface (7) of the wheel mounting flange (6). The annular groove (7a) includes a region where the hub bolts (6a) are mounted. The outer-side surface (7) of the wheel mounting flange (6) is formed as a cut surface cut after press-fitting of the hub bolts (6a). Weight reduction apertures (circular apertures) (13) are formed between the hub bolts 6a of the wheel mounting flange (6). A diameter of a circumscribed circle φA circumscribing the circular apertures (13) is set larger than an outer diameter φB of the annular groove (7a). Accordingly, muddy water is easily discharged from the circular apertures (13).

6 Claims, 8 Drawing Sheets

(56) References Cited

FOREIGN PATENT DOCUMENTS

| JP | 2010-089664 | 4/2010 |
|---|---|---|
| JP | 2014-031136 | 2/2014 |

\* cited by examiner

WHEEL BEARING APPARATUS

CROSS-REFERENCE TO RELATED APPLICATIONS

This application is a continuation of International Application No. PCT/JP2016/070914, filed Jul. 14, 2016, which claims priority to Japanese Application No. 2015-141921, filed Jul. 16, 2015. The disclosures of the above applications are incorporating herein by reference.

FIELD

The present disclosure relates to a wheel bearing apparatus that rotationally bears the weight of a vehicle wheel, such as an automobile, and, more particularly, to a wheel bearing apparatus that reduces the weight of the wheel bearing apparatus as well as suppress the generation of brake judder while enhancing the accuracy of the plane deflection of a wheel mounting flange. Thus, this improves the reliability of the wheel bearing apparatus.

BACKGROUND

In general, disc brakes are superior in braking performance and have become very popular. However, a problem exists in that the disc brakes cause vibrations and thus uncomfortable noise at low frequency especially at low speed traveling when braking, sandwiching a brake rotor between brake pads. Such a phenomenon is called brake judder. It has been recently noticed as a new subject in technology requiring analysis and improvement due to a desire to achieve high performance as well as silence in the vehicle.

Although theoretical mechanisms causing brake judder have not been found yet, it is believed that one factor is the accuracy of plane deflection of a pad sliding surface. The accuracy of plane deflection appears as a plane deflection of a side surface of the brake rotor due to accumulation of not only the plane deflection accuracies of the brake rotor itself but the wheel mounting flange on which the brake rotor is mounted, axial deflection of the rolling bearings, accuracy of the inner or outer raceway surfaces and the assembling accuracy of the rolling bearings.

In recent years, measures, for the plane deflection accuracy of the side surface of brake rotor described above, have been taken with satisfying conflicting demands of reduction of size and weight of the wheel bearing apparatus. This improves fuel consumption and increases the rigidity of the wheel bearing apparatus to improve driving stability of the vehicle.

Figure 7A:
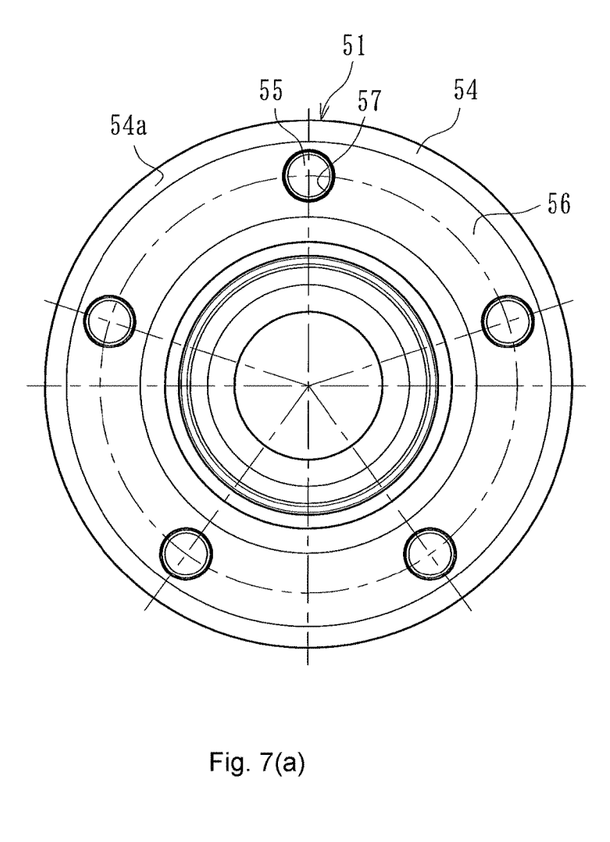
FIG. 7(a) is a side elevation view of a prior art wheel bearing apparatus.
Figure 7B:
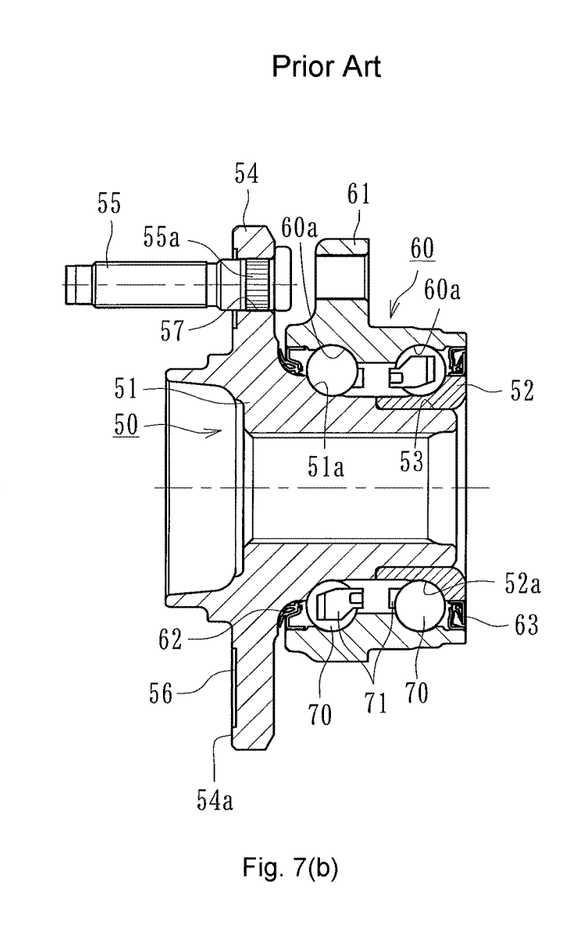
FIG. 7(b) is a longitudinal section view of FIG. 7(a).

One example of a known wheel bearing apparatus is shown in FIG. 7. This wheel bearing apparatus has an inner member 50, an outer member 60 and double row rolling elements 70, 70. The inner member 50 has a wheel hub 51 and an inner ring 52 press-fit onto a cylindrical portion 53 of the wheel hub 51. One inner raceway surface 51a is formed on the outer circumference of the wheel hub 51. The other inner raceway surface 52a is formed on the outer circumference of the inner ring 52. The wheel hub 51 is integrally formed, on its outer-side end, with a wheel mounting flange 54 to mount a wheel (not shown). Hub bolts 55 are mounted equidistantly on the wheel mounting flange 54.

On the other hand, the outer member 60 is formed, on its outer circumference, with a body mounting flange 61 adapted to be mounted on a body (not shown) of a vehicle. The outer member inner circumference includes double row outer raceway surfaces 60a, 60a. The double row rolling elements (balls) 70, 70 are rollably accommodated between the inner and outer raceway surfaces 51a, 52a and 60a, 60a, via cages 71, 71.

Seals 62, 63 are mounted on both end of the outer member 60 to seal annular spaces between the outer member 60 and the inner member 50. This prevents leakage of lubricating grease confined within the bearing and entry of rain water or dust from the outside into the bearing.

An annular groove 56 is formed on the outer-side surface 54a of the wheel mounting flange 54. Bolt apertures 57 are formed equidistantly along and in the annular groove 56. The hub bolts 55 are secured in the bolt apertures 57 by press-fitting knurled portions 55a of the hub bolts 55 into the bolt apertures 57. A wheel is adapted to be secured on the wheel mounting flange 54, via the brake rotor (not shown), by fastening nuts (not shown) onto the hub bolts 55.

The outer-side surface 54a of the wheel mounting flange 54 is finished processed by grinding after press-fitting of the hub bolts 55. This enables the deformation around the bolt aperture 57 or undulations of the side surface 54a generated by forming the bolt apertures 57 in the annular groove 56 and press-fitting the hub bolts 55 to mainly occur within the annular groove 56 as well as to suppress the influences to the accuracy of plane deflection of the side surface 54a caused by press-fitting of the hub bolts 55 to substantially zero. See, JP2003-154801 A.

Figure 8A:
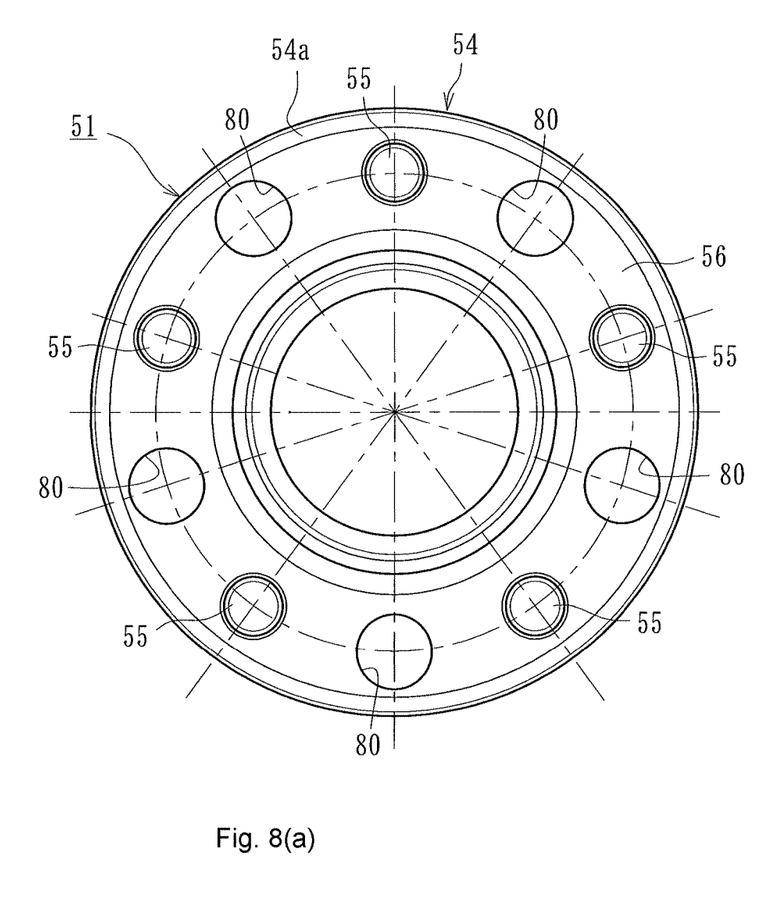
FIG. 8(a) is a side elevation view of a wheel bearing apparatus where weight reduction apertures are formed in a wheel mounting flange of FIG. 7(a).
Figure 8B:
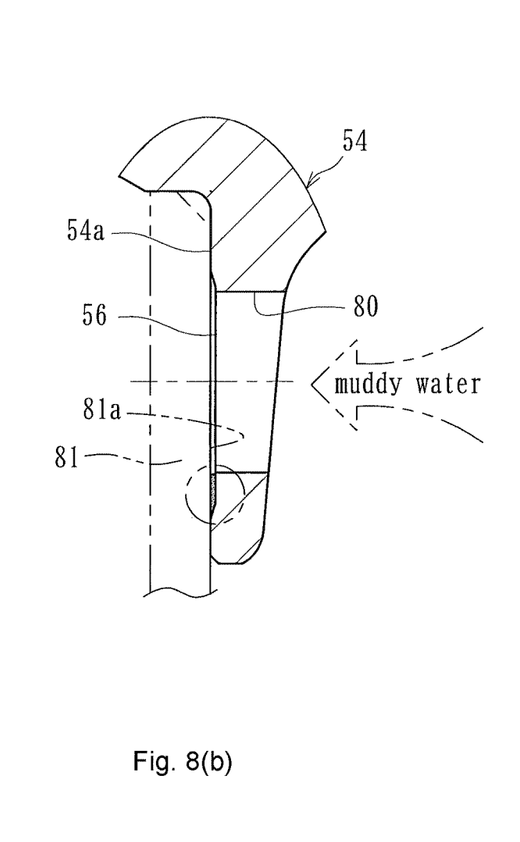
FIG. 8(b) is a partially enlarged view of a weight reduction aperture of FIG. 8(a).

However, in the prior art wheel bearing apparatus, when circular apertures (weight reduction apertures) 80 are formed between the hub bolts 55, as shown in FIG. 8(a), muddy water etc. that enters through the weight reduction apertures 80 and often remains in a clearance between the outer-side surface 54a of the wheel mounting flange 54 and a side surface 81a of the brake rotor 81. Thus, rusts is generated on the contact surfaces between the two. As a result, the accuracy of the plane deflection of the side surface 54a of the wheel mounting flange 54 becomes worse. Thus, it is believed that brake judder would be caused as well as the brake rotor 81 strongly fixed to the wheel mounting flange 54, via rust. Thus, disassembly of the brake rotor 81 from the wheel mounting flange 54 would be difficult.

The present disclosure has been achieved with focus on a structure that easily discharges muddy water etc. entering through the weight reduction apertures of the wheel mounting flange while preventing the muddy water etc. from remaining in a clearance space between the wheel mounting flange and the brake rotor. Thus, it is an object of the present disclosure to provide a wheel bearing apparatus that reduces its weight and improves reliability while enhancing the accuracy of the plane deflection of the wheel mounting flange and thus suppressing the generation of brake judder.

SUMMARY

To achieve the above objects, a wheel bearing apparatus comprises an outer member, an inner member and double row rolling elements. The outer member includes double row outer raceway surfaces on its inner circumference. The inner member outer circumference includes double row inner raceway surfaces. The inner raceway surfaces oppose the double row outer raceway surfaces. The double row rolling elements are rollably accommodated in a space between the inner raceway surfaces of the inner member and the outer raceway surfaces of the outer member. A wheel mounting flange, for mounting a wheel via a brake disc, is mounted on a rotary-side of one of the outer member or the inner member. Hub bolts, for fastening the wheel, are secured equidistantly along the wheel mounting flange. An annular groove is formed on the outer-side surface of the wheel mounting flange. The annular groove includes a region where the hub bolts are mounted. Weight reduction apertures are formed between the hub bolts of the wheel mounting flange. A diameter of a circumscribed circle circumscribing the weight reduction apertures is set larger than an outer diameter of the annular groove or the weight reduction apertures are opened to an outer circumferential surface of the wheel mounting flange.

The wheel bearing apparatus has a wheel mounting flange, to mount a wheel via a brake disc, mounted on a rotary-side of one of the outer member or the inner member. Hub bolts, to fasten the wheel, are secured equidistantly along the wheel mounting flange. An annular groove is formed on the outer-side surface of the wheel mounting flange. The annular groove includes a region where the hub bolts are mounted. Weight reduction apertures are formed between hub bolts on the wheel mounting flange. A diameter of a circumscribed circle circumscribing the weight reduction apertures is set larger than an outer diameter of the annular groove or the weight reduction apertures are opened to an outer circumferential surface of the wheel mounting flange. Thus, it is possible to provide a wheel bearing apparatus that easily discharges muddy water etc. entering into the weight reduction apertures of the wheel mounting flange while preventing the muddy water etc. from remaining in a clearance gap between the outer-side surface of the wheel mounting flange and the side surface of the brake disc. The wheel bearing apparatus can reduce its own weight and improve reliability while enhancing the accuracy of the plane deflection of the wheel mounting flange and thus suppress the generation of brake judder.

The outer-side surface of the wheel mounting flange is formed as a cut surface. It is cut after press-fitting of the hub bolts. This makes it possible to achieve the finish process by a simple turning process and thus reduce the manufacturing cost. In addition, it is possible to suppress the generation of brake judder while enhancing the accuracy of the plane deflection of the wheel mounting flange by reducing influences on the plane deflection due to press-fitting of hub bolts.

Each of the weight reduction apertures in the wheel mounting flange is formed as a tapered aperture gradually expanding toward the inner-side. This makes it possible to easily discharge muddy water etc. from the weight reduction apertures while preventing the muddy water etc. from remaining in a clearance space between the wheel mounting flange and the brake disc.

Radially extending drain grooves are formed by cutting a portion of each weight reduction aperture of the wheel mounting flange. This makes it possible to easily discharge muddy water etc. from the weight reduction apertures through the drain grooves even though the weight reduction apertures are formed within a region of the annular groove. This prevents the muddy water etc. from remaining in a clearance gap between the wheel mounting flange and the brake disc.

A radially extending reinforcing rib is formed, as a build-up part, on the inner-side surface of the wheel mounting flange. It is formed in a region where the hub bolt is secured. This makes it possible to reduce the weight of the wheel mounting flange while keeping its strength and rigidity.

Cut-off parts are formed on the outer circumference of the wheel mounting flange between the bolt apertures. The hub bolts are press-fit into the aperture while keeping clear or near the bolt apertures. Each of the cut-off parts are formed with a circular arc shape so that the deepest portions of the cut-off parts are positioned in proximity to a pitch circle diameter of the bolt apertures. This makes it possible to reduce the weight and size of the wheel mounting flange while keeping its strength and rigidity. Also, it suppresses the generation of brake judder while enhancing the accuracy of the plane deflection of the wheel mounting flange by reducing deformation of the wheel mounting flange due to its heat treatment.

A diameter of the deepest portions of the cut-off parts is smaller than an outer diameter of the annular groove. This makes it possible to make the weight reduction apertures open to the outer circumference of the wheel mounting flange. Accordingly, it is possible to easily discharge muddy water etc. entering into the weight reduction apertures of the wheel mounting flange through the deepest portions of the cut-off parts. This prevents the muddy water etc. from remaining in a clearance space between the wheel mounting flange and the brake disc. This also reduces the wheel bearing assembly's own weight and improves reliability while enhancing the accuracy of the plane deflection of the wheel mounting flange and thus suppresses the generation of brake judder.

The wheel bearing apparatus has an outer member, inner member and double row rolling elements. The outer member inner circumference includes double row outer raceway surfaces. The inner member outer circumferences include double row inner raceway surfaces opposing the double row outer raceway surfaces. The double row rolling elements are rollably accommodated in a space between the inner raceway surfaces of the inner member and the outer raceway surfaces of the outer member. A wheel mounting flange, to mount a wheel via a brake disc, is mounted on a rotary-side of one of the outer member or the inner member. Hub bolts, to fasten the wheel, are secured equidistantly along the wheel mounting flange. An annular groove is formed on the outer-side surface of the wheel mounting flange. The annular groove has a region where the hub bolts are mounted. Weight reduction apertures are formed between hub bolts of the wheel mounting flange. A diameter of a circumscribed circle circumscribing the weight reduction apertures is set larger than an outer diameter of the annular groove or the weight reduction apertures are opened to an outer circumferential surface of the wheel mounting flange. Thus, it is possible to provide a wheel bearing apparatus that can easily discharge muddy water etc. entering into the weight reduction apertures of the wheel mounting flange while preventing the muddy water etc. from remaining in a clearance space between the wheel mounting flange and the brake disc. This also reduces the wheel bearing assembly's own weight and improves reliability while enhancing the accuracy of the plane deflection of the wheel mounting flange and thus suppress the generation of brake judder.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The present disclosure is a wheel bearing apparatus with an outer member, inner member and rolling members. The outer member outer circumference includes a body mounting flange to be mounted on a knuckle forming a suspension apparatus. The outer member inner circumference includes double row outer raceway surfaces. The inner member includes a wheel hub and an inner ring. The wheel hub is integrally formed, on its one end, with a wheel mounting flange. The wheel hub outer circumference includes an inner raceway surface opposing one of the double row outer raceway surfaces. A cylindrical portion axially extends from the inner raceway surface. The inner ring is press-fit onto the cylindrical portion of the wheel hub. The inner ring outer circumference includes an inner raceway surface opposing the other of the double row outer raceway surfaces.

The double row rolling elements are rollably accommodated in a space between the inner raceway surfaces of the inner member and the outer raceway surfaces of the outer member. Hub bolts, to fasten a wheel mounted on the wheel mounting flange, are equidistantly position along the wheel mounting flange. An annular groove is formed on the outer-side surface of the wheel mounting flange. The annular groove includes a region where the hub bolts are mounted. The outer-side surface of the wheel mounting flange is formed as a cut surface, cut after press-fitting of the hub bolts. Weight reduction apertures are formed between hub bolts on the wheel mounting flange. A diameter of a circumscribed circle circumscribing the weight reduction apertures is set larger than an outer diameter of the annular groove.

Figure 1:
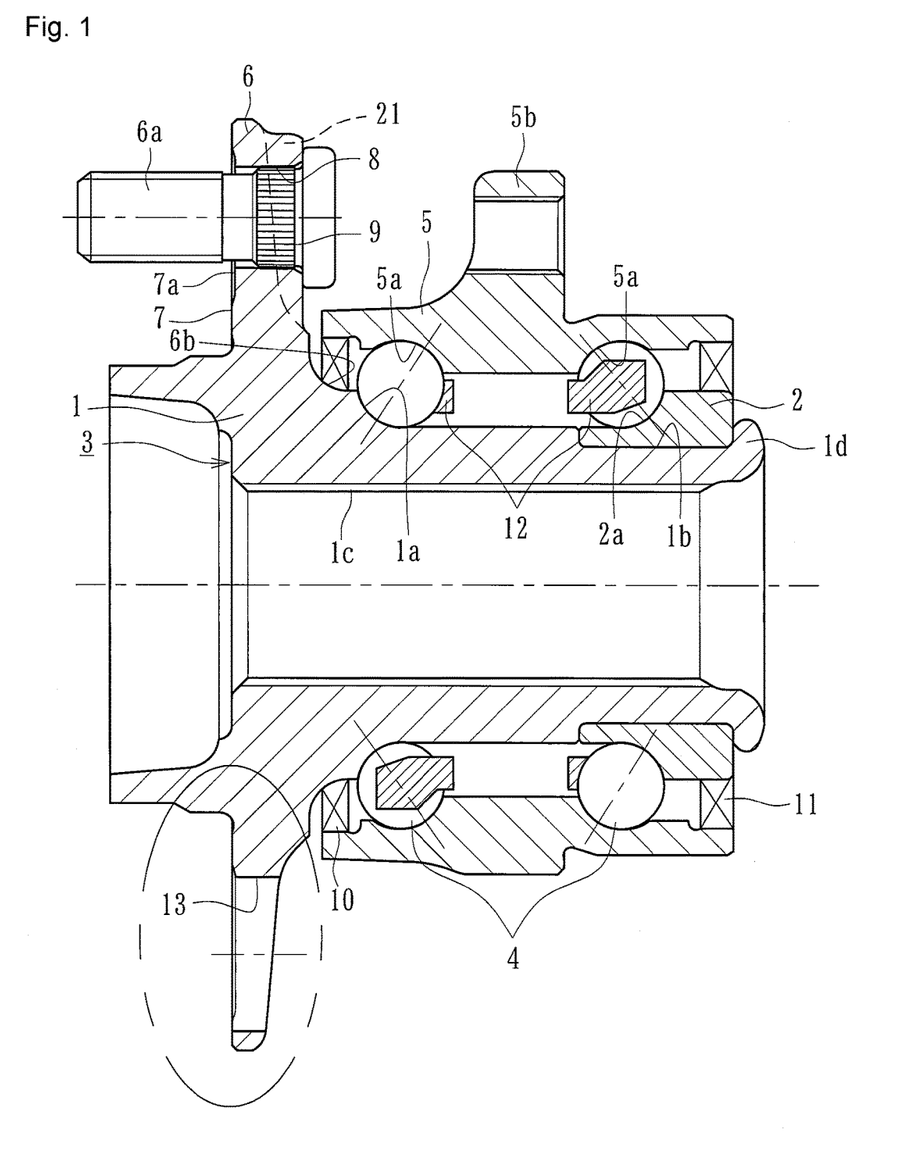
FIG. 1 is a longitudinal section view of a first embodiment of the wheel bearing apparatus of the present disclosure.
Figure 2:
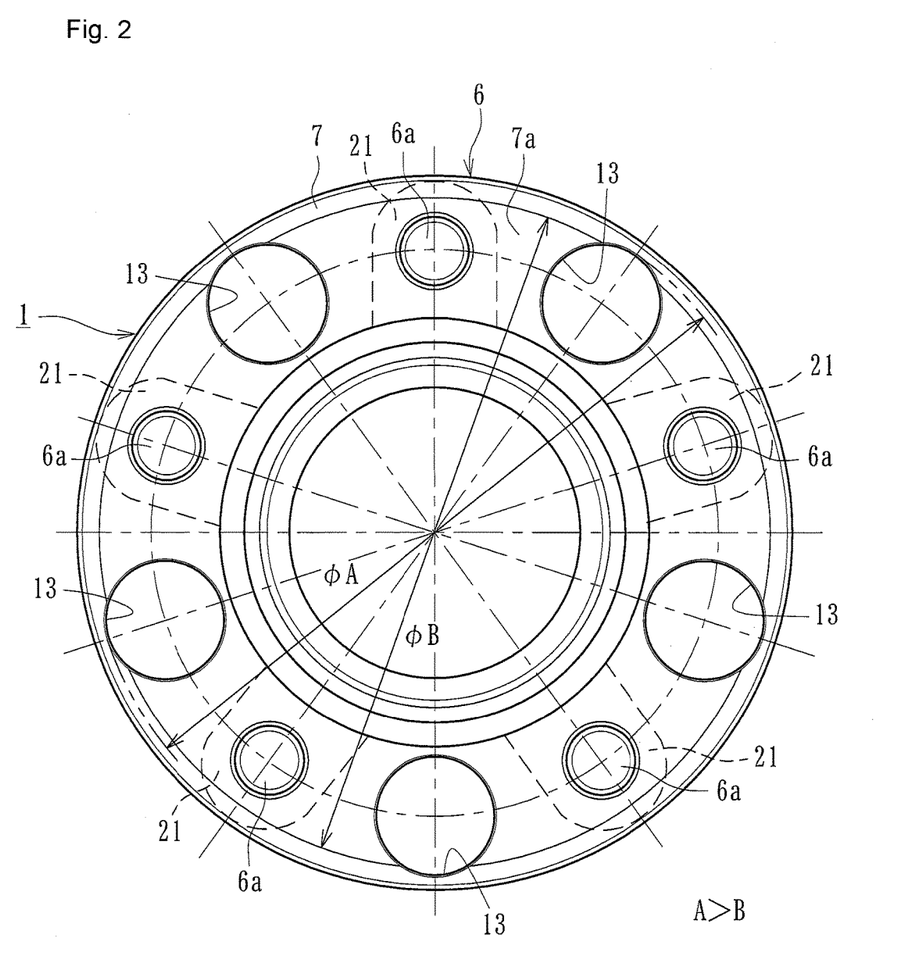
FIG. 2 is a side elevation view of a wheel hub of FIG. 1.
Figure 3:
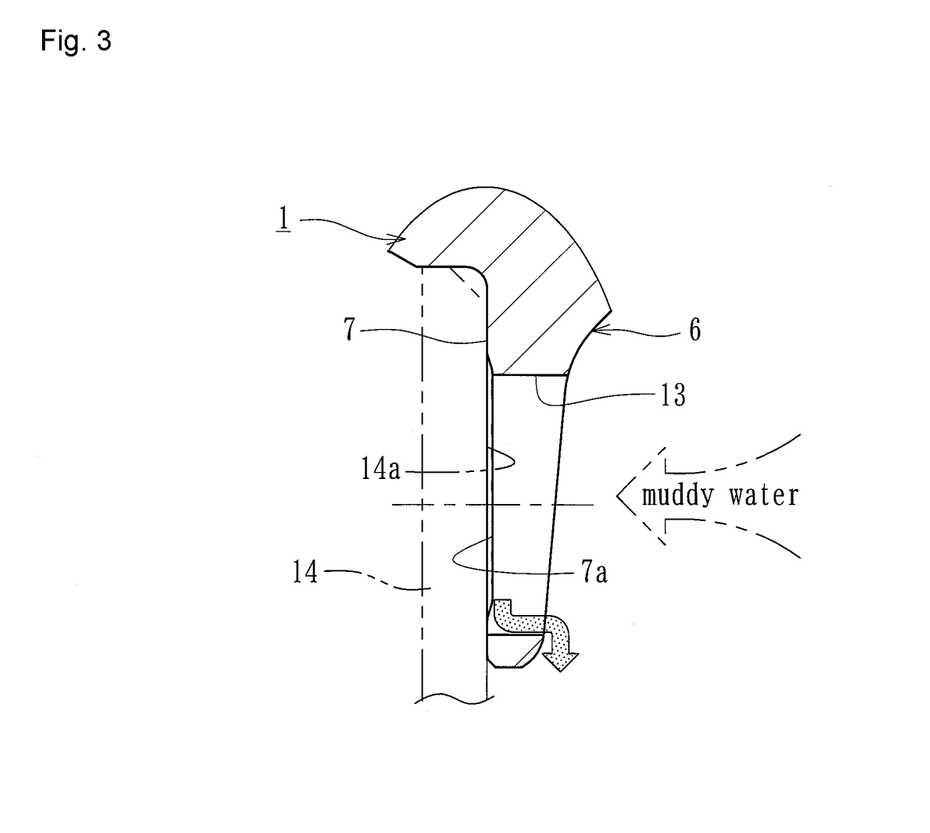
FIG. 3 is a partially enlarged view of a weight reduction aperture of FIG. 1.
Figure 4A:
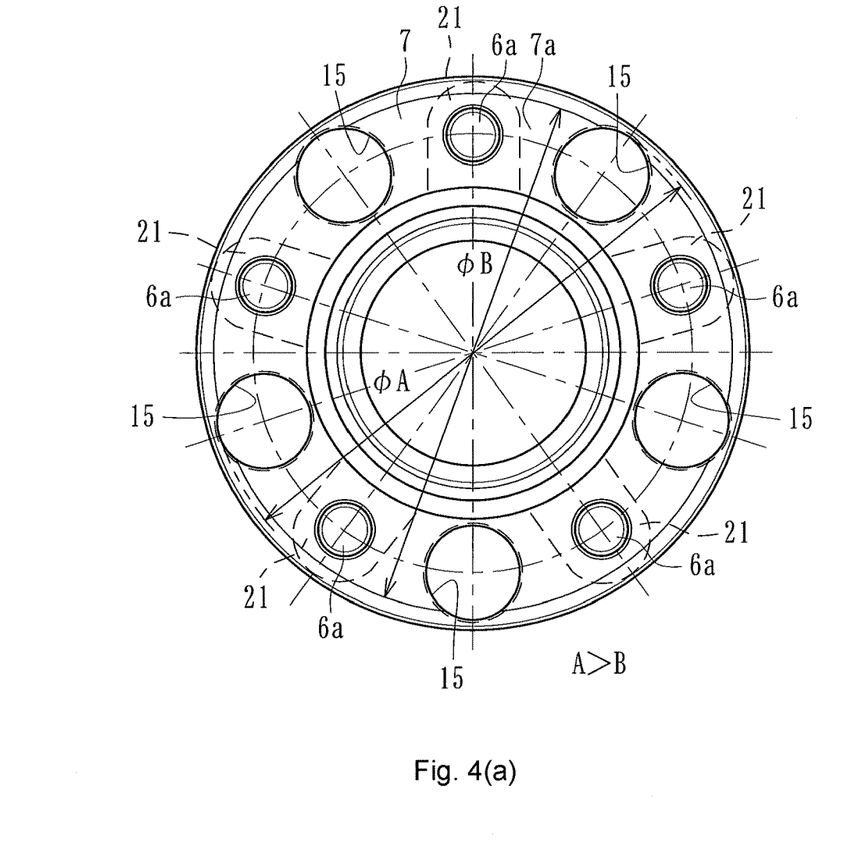
FIG. 4(a) is a side elevation view of one modification of FIG. 1.
Figure 4B:
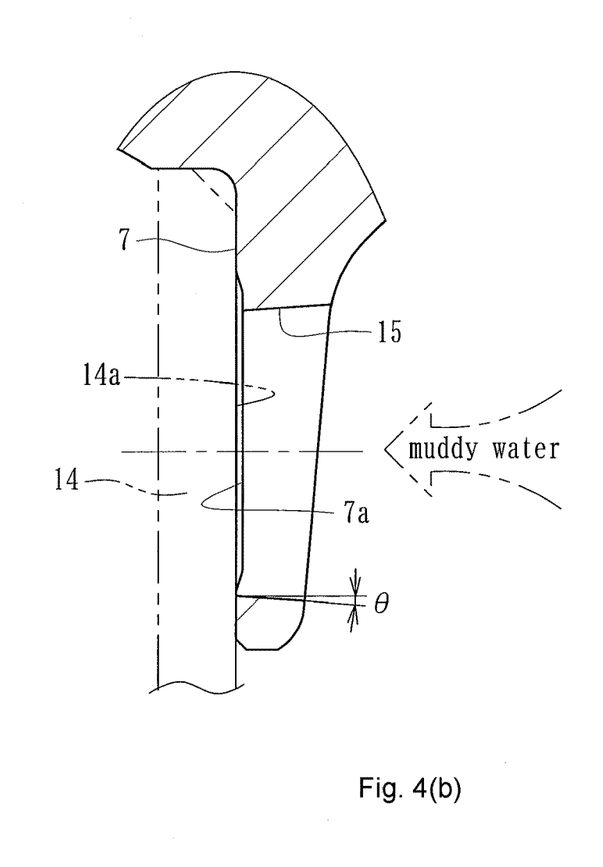
FIG. 4(b) is a partially enlarged view of a weight reduction aperture of FIG. 4(a).
Figure 5A:
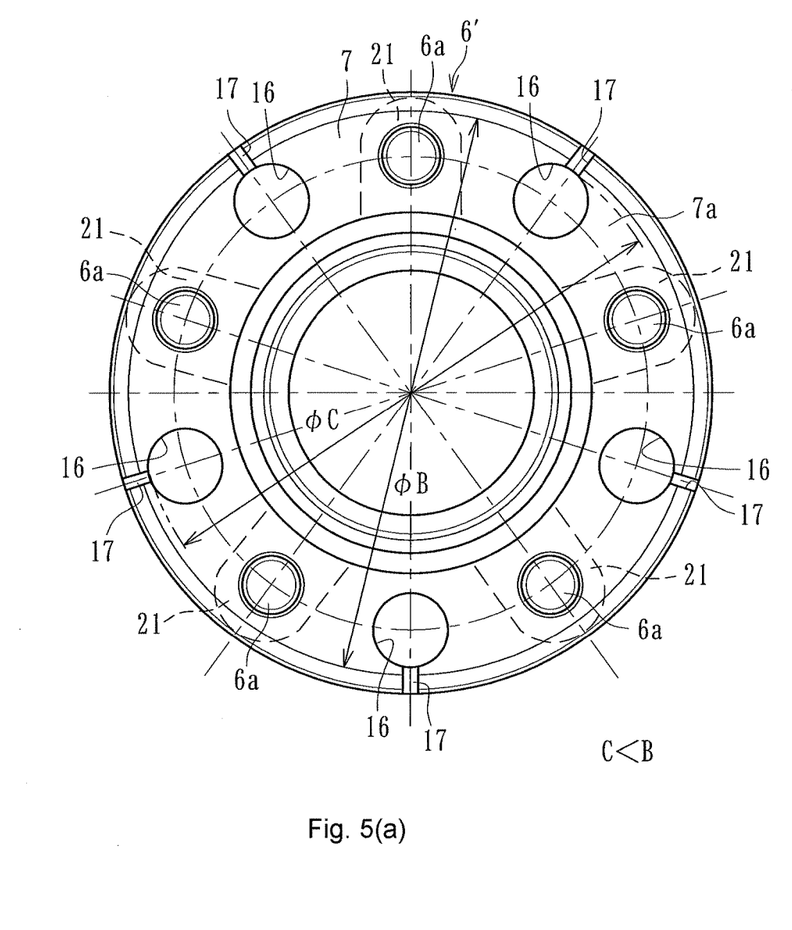
FIG. 5(a) is a side elevation view of another modification of FIG. 1.
Figure 5B:
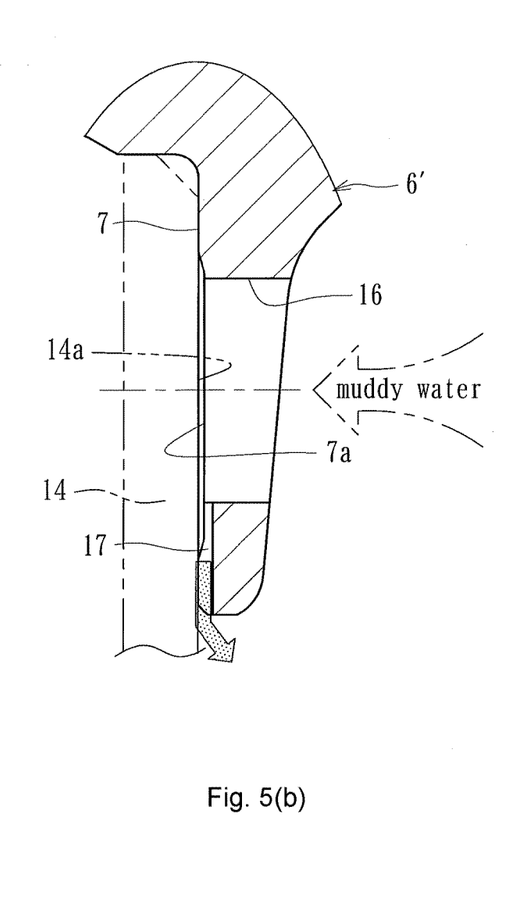
FIG. 5(b) is a partially enlarged view of a weight reduction aperture of FIG. 5(a).

Embodiments will be described with reference to the accompanied drawings. FIG. 1 is a longitudinal section view of a first embodiment of the wheel bearing apparatus. FIG. 2 is a side elevation view of a wheel hub of FIG. 1. FIG. 3 is a partially enlarged view of a weight reduction aperture of FIG. 1. FIG. 4(a) is a side elevation view of one modification of FIG. 1. FIG. 4(b) is a partially enlarged view of a weight reduction aperture of FIG. 4(a). FIG. 5(a) is a side elevation view of another modification of FIG. 1. FIG. 5(b) is a partially enlarged view of a weight reduction aperture of FIG. 5(a). In the description of this specification, an outer-side of a bearing apparatus, when it is mounted on a vehicle, is referred to as the "outer-side" (left-side in FIG. 1(b)). An inner-side of a bearing apparatus, when it is mounted on a vehicle, is referred to as the "inner-side" (right-side in FIG. 1(b)).

The wheel bearing apparatus shown in FIG. 1 is a so-called "third generation" type for a driving wheel. It includes an inner member 3 including a wheel hub 1 and an inner ring 2 press-fit onto the wheel hub 1. An outer member 5 is mounted on the inner member 3, via a double row rolling elements (balls) 4, 4.

The wheel hub 1 is integrally formed, on its outer-side end, with a wheel mounting flange 6. The flange 6 mounts a wheel, via a brake disc or a brake drum (not shown). The wheel hub outer circumference includes one (outer-side) inner raceway surface 1a. A cylindrical portion 1b axially extends from the inner raceway surface 1a. A serration (or spline) 1c, for torque transmission, is formed on the inner circumference of the wheel hub 1. Hub bolts 6a are secured at circumferentially equidistant positions on the wheel mounting flange 6.

The inner ring 2 is formed, on its outer circumference, with an inner raceway surface 2a. The inner ring 2 is press-fit, via a predetermined interference, onto the outer circumference of the cylindrical portion 1b of the wheel hub 1. The inner ring 2 is axially secured on the cylindrical portion 1b by a caulked portion 1d. The caulked portion 1d is formed by plastically deforming radially outward an end of the cylindrical portion 1b under a predetermined bearing pre-pressure.

An outer-side surface 7, surface where a brake disc is mounted, of the wheel mounting flange 6 is primarily cut by turning. An annular groove (circumferential groove) 7a is formed in the surface 7 with a predetermined width. Bolt apertures 8 are formed in the annular groove 7a at center positions in the groove width direction equidistantly along the annular groove 7a. The side surface 7 is secondarily cut by turning after knurled portions 9 of the hub bolts 6a have been press-fit into the bolt apertures 8. The secondary cut may be performed by other cutting using a milling machine or grinding machine.

The wheel hub 1 is made of medium-high carbon steel such as S53C including carbon of 0.40~0.80% by weight. It is hardened by high frequency induction hardening to have a surface hardness of 50~64 HRC over the inner raceway surface 1a and a region from an inner-side base 6b of the wheel mounting flange 6, forming a seal land portion of a seal 10, to the cylindrical portion 1b. The caulked portion 1d is not hardened and is kept with a hardness after forging. This not only improves the anti-friction property of the base portion 6b of the wheel mounting flange 6 but applies sufficient mechanical strength against a rotary bending load loaded on the wheel mounting flange 6. In addition, it is possible to improve the anti-fretting property of the cylindrical portion 1b where the inner ring 2 is press-fit and perform the caulking process of the caulked portion 1d without causing any micro cracks.

The inner ring 2 is formed from high carbon chrome steel such as SUJ2. It is hardened to its core to have a hardness of 58~64 HRC. The rolling elements (balls) 4 are formed of high carbon chrome steel such as SUJ2. They are dip hardened to their cores to have a hardness of 62~67 HRC.

The outer member 5 is formed, on its outer circumference, with a body mounting flange 5b. The body mounting flange 5b is adapted to mount onto a knuckle (not shown) to form part of the suspension. The outer member inner circumference includes double row outer raceway surfaces 5a, 5a that oppose the inner raceway surfaces 1a, 2a of the inner member 3. The double row rolling elements 4, 4 are rollably contained between the inner and outer raceway surfaces 1a, 2a and 5a, 5a, via cages 12.

The outer member 5 is formed of medium-high carbon steel such as S53C including carbon of 0.40~0.80% by weight. At least the outer raceway surfaces 5a, 5a are hardened by high frequency induction hardening to have a surface hardness of 58~64 HRC. Seals 10, 11 are arranged at annular side openings formed between the outer member 5 and the inner member 3. The seals 10, 11 prevent lubricating grease, filled in the bearing, from leaking outside and rain water or dust from entry into the bearing from the outside.

Although the wheel bearing apparatus is shown here formed by a double row angular contact ball bearing using balls as rolling elements 4, the present disclosure is not limited to such a bearing. Double row tapered roller bearings using tapered rollers as the rolling elements 4 may be used. In addition, although it is shown here on the third generation type bearing, the present disclosure can be applied to a second generation type bearing, with a pair of inner rings press-fit onto the cylindrical portion, or a fourth generation type bearing, where the inner raceway surfaces are directly formed on the outer circumferences, respectively, of a wheel hub and an outer joint member of a constant velocity universal joint (not shown).

As shown in FIG. 2, a reinforcing rib 21 is formed, in a region where the hub bolt 6a is secured, as a build-up part on the inner-side surface of the wheel mounting flange 6. Each reinforcing rib 21 has a width substantially same as a formation part of each bolt aperture 8. The rib 21 extends radially outward from the annular base 6b of the wheel mounting flange 6 (see FIG. 1).

When the width of the annular groove 7a formed on the outer-side surface 7 of the wheel mounting flange 6 is larger, it is preferable that the workability of the secondary cutting of the side surface 7 occur after press-fitting of hub bolts 6a. However, it is believed that the contact area between the side surface of the brake rotor and the side surface 7 of the wheel mounting flange would be reduced and the strength and rigidity of the wheel mounting flange 6 would be reduced. Thus, the wheel mounting flange would be deformed by fastening of the nuts. In this embodiment, if a distance from the outer diameter of each hub bolt 6a to the annular groove 7a is set at least 1 mm, it has been found that the contact area between the brake rotor and the wheel mounting flange 6 is not largely reduced and the deformation of the wheel mounting flange during fastening of a wheel by nuts can be suppressed. Thus, worsening of the accuracy of the plane deflection of the side surface of the brake rotor can be limited to minimum. In this case, when a space more than 1 mm from the outer diameter of each hub bolt 6a remains, workability of the cutting operation using a bite will not be worsened without interference of the bite and hub bolts 6a.

As described above, the deformation of the outer-side surface 7 caused by press-fitting of hub bolts 6a will be limited to a minimum by forming the annular groove 7a on the side surface 7 of the wheel mounting flange 6. In addition, if secondary cutting is performed on the outer-side surface 7 where the brake rotor contacts, the plane deflection that would be caused by press-fitting of the hub bolts 6a will be substantially reduced. Thus, the generation of brake judder will be suppressed by enhancing the accuracy of the plane deflection of the wheel mounting flange 6.

Although the present disclosure has been described with reference to an embodiment where the primary cutting of the outside-surface 7 of the wheel mounting flange 6 is previously performed before press-fitting the hub bolts 6a and then secondary cutting is performed after press-fitting of the hub bolts 6a, the present disclosure is not limited to such an embodiment. For example, it may be possible to perform primary cutting, via rough turning and semi-finish turning, before press-fitting of the hub bolts 6a. Secondary cutting (finish turning) would be performed after press-fitting of the hub bolts 6a. In addition, it may be possible to omit the turning before press-fitting of the hub bolts 6a while remaining in a forged skin state and perform secondary cutting (finish turning) after press-fitting of the hub bolts 6a.

Circular apertures (weight reduction apertures) 13 are formed, by forging, between the hub bolts 6a of the wheel mounting flange 6 equidistantly along a desired diameter of the flange. The weight reduction apertures 13 are formed beyond the outer diameter of the annular groove 7a. That is, when a diameter of a circle circumscribing the weight reduction apertures 13 is defined as "A" and an outer diameter of the annular groove 7a is defined as "B", it is set so that A>B. Accordingly, as shown in an enlarged view of FIG. 3, such an arrangement of the weight reduction apertures 13 and the annular groove 7a enables muddy water etc. entering into the weight reduction apertures 13 to be easily discharge through the weight reduction apertures 13 as shown by an arrow in FIG. 3 without remaining in a clearance between the side surface 7 of the wheel mounting flange 6 and the side surface 14a of the brake disc 14. Thus, it is possible to provide a wheel bearing apparatus that reduces its own weight and improves reliability while enhancing the accuracy of the plane deflection of the wheel mounting flange 6 and thus suppresses the generation of brake judder.

FIG. 4 shows modified circular apertures i.e. weight reduction apertures 15 of the previously described ones. Similarly to the weight reduction apertures 13 of first embodiment, the diameter "A" of a circle circumscribing the weight reduction apertures 15 is larger than the outer diameter "B" of the annular groove 7a, as shown in FIG. 4(a). In this modification, an inner circumferential surface of each of the weight reduction apertures 15 is tapered. The taper is on an inclined angle θ gradually expanding toward the inner-side of the wheel mounting flange 6 as shown in FIG. 4(b). Accordingly, it is possible to more easily discharge muddy water etc. from the weight reduction apertures 15 while preventing the muddy water etc. from remaining in a clearance between the side surface 7 of the wheel mounting flange 6 and the side surface 14a of the brake disc 14.

FIG. 5 shows another modification of the previously described weight reduction apertures 13. The weight reduction apertures 16 of this modification are formed so that they are arranged at positions radially inside of the outer diameter of the annular groove 7a as shown in FIG. 5(a). That is, the diameter "C" of a circle circumscribing the weight reduction apertures 16 is smaller than the outer diameter "B" of the annular groove 7a (C<B). In addition, radially extending drain grooves 17 are formed by cutting a portion of each weight reduction aperture 16 of the wheel mounting flange 6'. This makes the drain grooves 17 open to the outer circumferential surface of the wheel mounting flange 6'. This makes it possible to easily discharge muddy water etc. from the weight reduction apertures 16 through the drain grooves 17 even though the weight reduction apertures 16 are formed within a region of the annular groove 7a while preventing the muddy water etc. from remaining in a clearance between the outer-side surface 7 of the wheel mounting flange 6' and the side surface 14a of the brake disc 14.

Figure 6A:
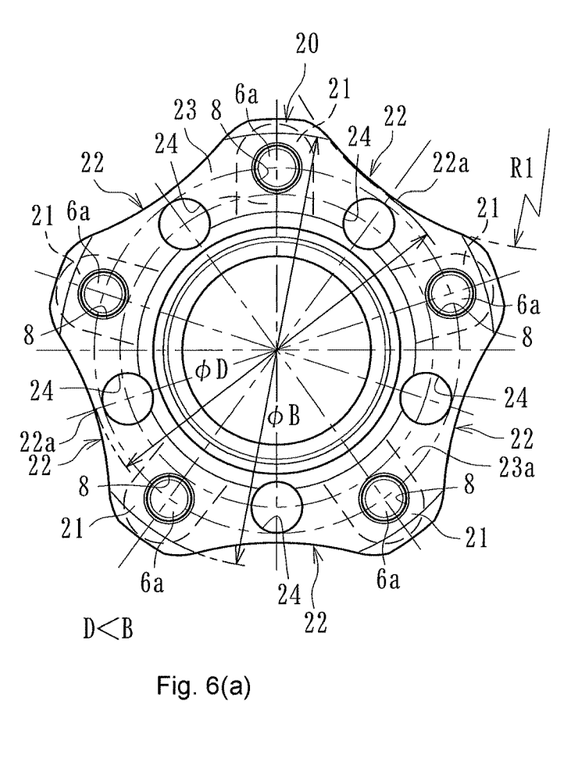
FIG. 6(a) is a side elevation view of a second embodiment of the wheel bearing apparatus.
Figure 6B:
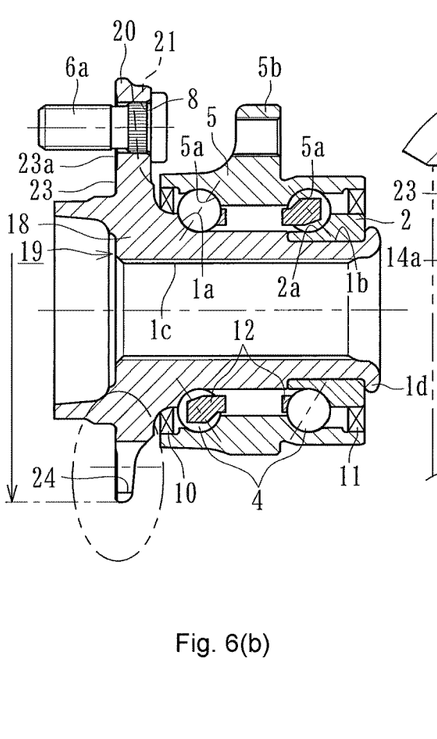
FIG. 6(b) is a longitudinal section view of FIG. 6(a).
Figure 6C:
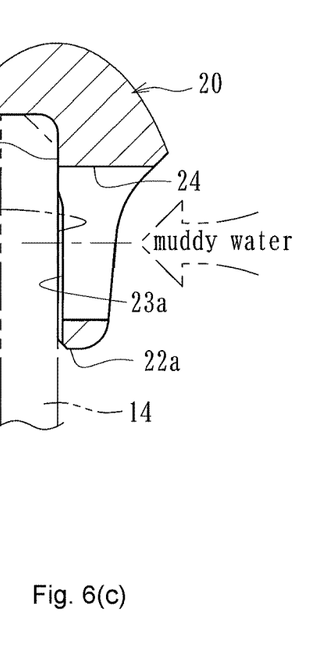
FIG. 6(c) is a partially enlarged view of a weight reduction aperture of FIG. 6(b).

FIG. 6(a) is a side elevation view of a second embodiment of the wheel bearing apparatus. FIG. 6(b) is a longitudinal section view of FIG. 6(a). FIG. 6(c) is a partially enlarged view of a weight reduction aperture of FIG. 6(b). The second embodiment is different from the first embodiment basically only in the configuration of the wheel mounting flange. Accordingly, the same reference numerals as those used in the first embodiment are also used here and their descriptions will be omitted.

The wheel bearing apparatus shown in FIG. 6(b) is a so-called "third generation" type for a driving wheel. It includes an inner member 19, with a wheel hub 18 and an inner ring 2 press-fit onto the wheel hub 18, an outer member 5, mounted on the inner member 19, via a double row rolling elements (balls) 4, 4.

The wheel hub 18 is integrally formed, on its outer-side end, with a wheel mounting flange 20 to mount a wheel, via a brake disc (not shown). The wheel hub outer circumference includes one inner raceway surface 1a. A cylindrical portion 1b axially extends from the inner raceway surface 1a. A serration 1c, for torque transmission, is formed on the inner circumference of the wheel hub 18. Hub bolts 6a are secured on the wheel mounting flange 20 at its circumferentially equidistant positions.

As shown in FIG. 6(a), a reinforcing rib 21 is formed as a build-up part on the inner-side surface of the wheel mounting flange 20 in a region where the hub bolts 6a are secured. Each reinforcing rib 21 has a width substantially the same as a formation part of each bolt aperture 8. The reinforcing rib 21 extends radially outward from the annular base 6b of the wheel mounting flange 20.

In addition, cut-off parts 22, each having a circular arc shape, are formed on the outer circumference of the wheel mounting flange 20 between the bolt apertures 8 while keeping clear or near the bolt apertures 8. The circular arc, of each cut-off part 22, is arranged so that its deepest portions 22a is positioned in proximity to a pitch circle diameter PCDb of the bolt apertures 8. That is, the cut-off parts 22 are positioned radially outer side of the pitch circle diameter PCDb of the bolt apertures 8 and smoothly continued to the outer circumference of the wheel mounting flange 20. The center of curvature of each cut-off part is positioned on an extension line of a line through the center of the wheel hub 18 and a central point between mutually adjacent bolt apertures 8. The radius of curvature R1 is set as R1=0.7~1.5 PCDb. This reduces the weight and size of the wheel hub 18 while keeping its strength and rigidity. Also, this suppresses the generation of brake judder while enhancing the accuracy of the plane deflection of wheel mounting flange 20 by reducing deformation of the wheel mounting flange 20 due to its heat treatment.

In this case, when the radius of curvature R1 is set as R1<0.7 PCDb, plastic flow of forged material would be obstructed and accordingly the accuracy would be worsened by the generation of sink etc. On the contrary, when the radius of curvature R1 is set as R1>1.5 PCDb, the weight reduction effect brought by the cut-off parts 22 could not be expected.

In general, such a wheel hub is formed by hot forging. The wheel mounting flange has a flower-shape and its material between the bolt apertures 8 is insufficient. It is usually necessary to protrude excessive forged material between tools (punch and/or die) as burrs in order to improve the accuracy of forging when the wheel hub is formed by a so-called closed forging method where upset parts of the wheel hub are restricted. However, in the wheel hub 18 of this embodiment, since the cut-off parts 22 are positioned outside of the PCDb of the bolt apertures and sufficient material is present between the bolt apertures 8, it is possible to perform the forging process efficiently and accurately without obstructing plastic flow of the material. Accordingly, corner portions, stepped portions and chamfered portions of material can be perfectly formed by the closed forging method. Thus, removal of burrs can be limited to minimum. Thus, it is possible to reduce manufacturing cost by the reduction of manufacturing steps.

Similarly to the previously described embodiment, the annular groove 23a is formed on the outer-side surface 23 of the wheel mounting flange 20. The annular groove 23a has a discontinuous shape since the wheel mounting flange 20 has a flower-shape not a circular shape of the previous wheel mounting flange 6. The bolt apertures 8 are formed at the center of both the groove width of the annular groove 23a and the hub bolts 6a equidistantly along the annular groove 23a. The secondary cutting of the side surface 23 is performed by turning after press-fitting of the hub bolts 6a into the bolt apertures 8.

The weight reduction apertures (circular apertures) 24 are formed by forging equidistantly along a desired diameter of the wheel mounting flange 20, between the hub bolts 6a. The weight reduction apertures 24 are positioned radially inside of the outer diameter of the annular groove 23a. That is, a diameter D of the deepest portions 22a of the cut-off parts 22 is smaller than an outer diameter B of the annular groove 23a (D<B). As shown in FIG. 6(c), this makes it possible to easily discharge muddy water etc. entering into the weight reduction apertures 24 of the wheel mounting flange 20 through the deepest portions 22a of the cut-off parts 22 while preventing the muddy water etc. from remaining in a clearance space or gap between the outer-side surface 23 of the wheel mounting flange 20 and the side surface 14a of the brake disc 14. Also, this reduces its own weight and improves reliability while enhancing the accuracy of the plane deflection of the wheel mounting flange 20. Thus, this suppresses the generation of brake judder.

The present disclosure can be applied to a wheel bearing apparatus of the second to fourth generation types provided with a rotational wheel, such as a wheel hub etc., with a wheel mounting flange at one end.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:
1. A wheel bearing apparatus comprising:
an outer member, an outer member inner circumference includes double row outer raceway surfaces;
an inner member, an inner member outer circumferences includes double row inner raceway surfaces opposing the double row outer raceway surfaces;
double row rolling elements are rollably accommodated in a space between the inner raceway surfaces of the inner member and the outer raceway surfaces of the outer member;

a wheel mounting flange for mounting a wheel, via a brake disc, is formed on a rotary-side of one of the outer member or the inner member;

hub bolts, to fasten the wheel, are secured equidistantly along the wheel mounting flange;

an annular groove is formed on the outer-side surface of the wheel mounting flange, the annular groove includes a region where the hub bolts are mounted, weight reduction apertures are formed between the hub bolts on the wheel mounting flange, a diameter of a circumscribed circle circumscribing the weight reduction apertures is set larger than an outer diameter of the annular groove; and each of the weight reduction apertures of the wheel mounting flange is formed as a tapered aperture gradually expanding toward the inner-side.

2. The wheel bearing apparatus of claim 1, wherein the outer-side surface of the wheel mounting flange is formed as a cut surface cut after press-fitting of the hub bolts.

3. The wheel bearing apparatus of claim 1, wherein a radially extending reinforcing rib is formed as a build-up part on the inner-side surface of the wheel mounting flange in a region in which the hub bolt is secured.

4. A wheel bearing apparatus comprising:
an outer member, an outer member inner circumference includes double row outer raceway surfaces;
an inner member, an inner member outer circumferences includes double row inner raceway surfaces opposing the double row outer raceway surfaces;
double row rolling elements are rollably accommodated in a space between the inner raceway surfaces of the inner member and the outer raceway surfaces of the outer member;
a wheel mounting flange for mounting a wheel, via a brake disc, is formed on a rotary-side of one of the outer member or the inner member;
hub bolts, to fasten the wheel, are secured equidistantly along the wheel mounting flange;
an annular groove is formed on the outer-side surface of the wheel mounting flange, the annular groove includes a region where the hub bolts are mounted, weight reduction apertures are formed between the hub bolts on the wheel mounting flange, the weight reduction apertures are opened to an outer circumferential surface of the wheel mounting flange; and
radially extending drain grooves are formed by cutting a portion adjacent each weight reduction aperture of the wheel mounting flange.

5. A wheel bearing apparatus comprising:
an outer member, an outer member inner circumference includes double row outer raceway surfaces;
an inner member, an inner member outer circumferences includes double row inner raceway surfaces opposing the double row outer raceway surfaces;
double row rolling elements are rollably accommodated in a space between the inner raceway surfaces of the inner member and the outer raceway surfaces of the outer member;
a wheel mounting flange for mounting a wheel, via a brake disc, is formed on a rotary-side of one of the outer member or the inner member;
hub bolts, to fasten the wheel, are secured equidistantly along the wheel mounting flange;
an annular groove is formed on the outer-side surface of the wheel mounting flange, the annular groove includes a region where the hub bolts are mounted, weight reduction apertures are formed between the hub bolts on the wheel mounting flange, the weight reduction apertures are opened to an outer circumferential surface of the wheel mounting flange; and
cut-off parts are formed on the outer circumference of the wheel mounting flange between the bolt apertures where the hub bolts are press-fit, the cut-off parts keeping clear of near the bolt apertures, and each of the cut-off parts is formed with a circular arc shape so that deepest portions of the cut-off parts are positioned in proximity to a pitch circle diameter of the bolt apertures.

6. The wheel bearing apparatus of claim 5, wherein a diameter of the deepest portions of the cut-off parts is smaller than an outer diameter of the annular groove.

* * * * *